June 20, 1961 E. A. THOMPSON 2,988,805
ART OF MAKING A TAPPET
Filed July 29, 1954 5 Sheets-Sheet 1

INVENTOR.
EARL A. THOMPSON
BY
Barnes, Kisselle, Laughlin & Raisch
ATTORNEYS.

June 20, 1961  E. A. THOMPSON  2,988,805
ART OF MAKING A TAPPET

Filed July 29, 1954  5 Sheets-Sheet 2

INVENTOR.
EARL A. THOMPSON
BY
Barnes, Kisselle, Laughlin & Raisch
ATTORNEYS.

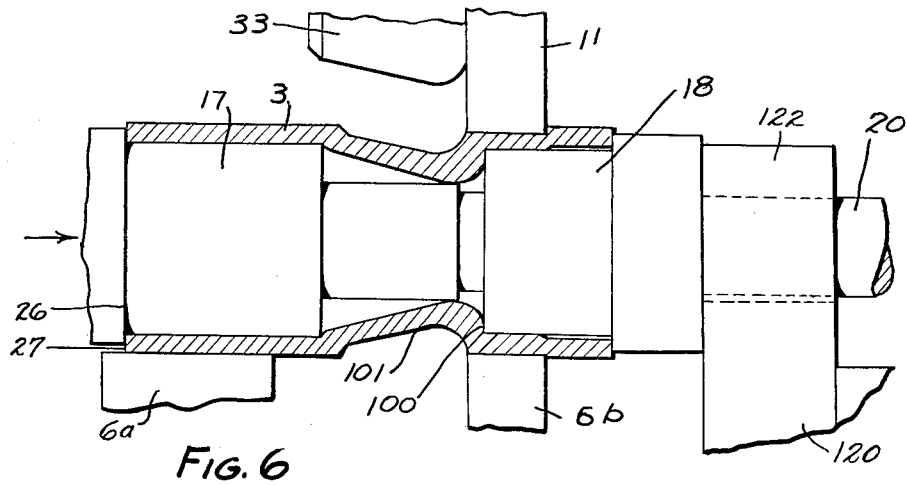
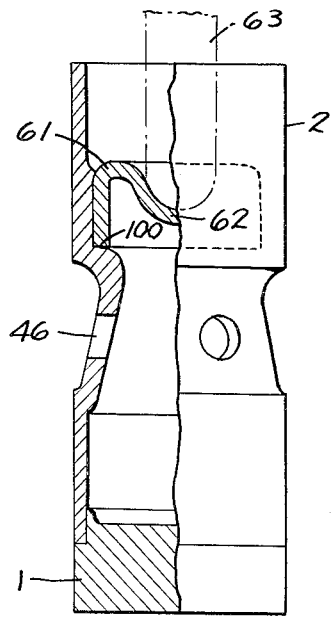
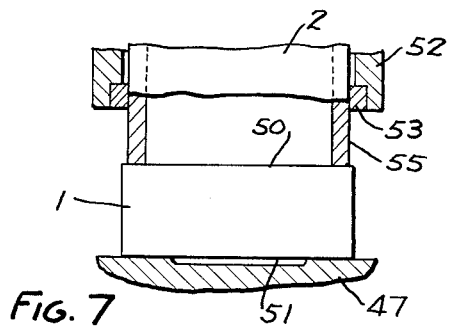
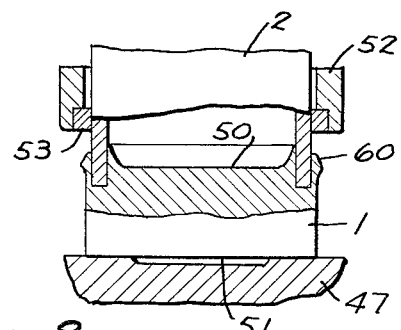

June 20, 1961  E. A. THOMPSON  2,988,805
ART OF MAKING A TAPPET
Filed July 29, 1954  5 Sheets-Sheet 4

INVENTOR.
EARL A. THOMPSON
BY
Barnes, Kisselle, Laughlin & Raisch
ATTORNEYS.

INVENTOR
EARL A. THOMPSON

ATTORNEYS.

2,988,805
ART OF MAKING A TAPPET
Earl A. Thompson, Ferndale, Mich.
(1300 Hilton Road, Ferndale Station, Detroit 20, Mich.)
Filed July 29, 1954, Ser. No. 446,497
6 Claims. (Cl. 29—156.7)

This invention relates to a valve tappet and the art of making a tappet.

A tappet is an element adapted to be located between an operator, such as a cam, and a push rod for operating a poppet valve of an internal combustion engine. This invention is particularly concerned with the art of making tappets by a method or methods which are more economical than those currently in use.

The invention is also concerned with a tappet which is well adapted to perform its function in the current high-powered internal combustion automobile engine with its high tappet loading and in such engines as their horsepower is increased in the future.

The methods disclosed as being used to make this tappet are applicable to many other fields and should not be construed as referring only to the art of making a tappet.

This method uses electrical heating equipment similar to what is commonly used in resistance welding, but in this case, is distinguished from resistance welding by the fact that we are joining metals having dissimilar and well known melting points, such as, cast iron, which has a melting temperature of approximately, or in the neighborhood of, 2300° F., and steel, which has a melting temperature of approximately, or in the neighborhood of, 2800° F. depending on the compositions of the cast iron and steel.

In this method, in which we are fusing together two materials which have different melting points, both materials are brought up to the melting temperature of the material which has the lowest melting point, then by subjecting these two parts to a high pressure, the part made of the material with the high melting point melts its way into the part made of the material with the lower melting point. When the source of electrical energy, which is producing the heating and melting of these two parts, is cut off the molten material solidifies and fuses to the other material forming a very secure union. This is entirely different from butt welding in which two pieces of the same metals are joined by bringing the mating surfaces up to the melting point of the metals and then exerting a light pressure. This method of butt welding cannot be used successfully with parts made from metals having different melting points.

This invention contemplates a tappet having a steel body and an end piece, or base, of cast or sintered iron, or ferrous base alloys having a lower melting point than steel and which is either fused or mechanically joined to the body or both.

According to the method herein described the tappet can be made rapidly and in an economical manner and the body and base are strongly and permanently secured together.

FIG. 6 is a fragmentary view of the apparatus showing the tube after it has been upset longitudinally to form an internal shoulder therein.

FIGS. 7 and 8 show the steps of one method for fusing the body and base of the tappet together.

FIG. 9 is an elevation partly in section showing one form of finished tappet.

Figure 10:
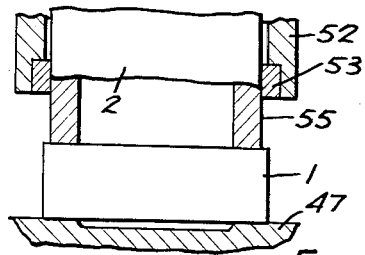
Figure 11:
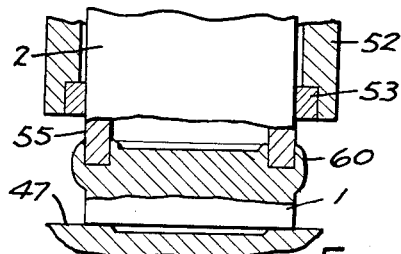
Figure 12:
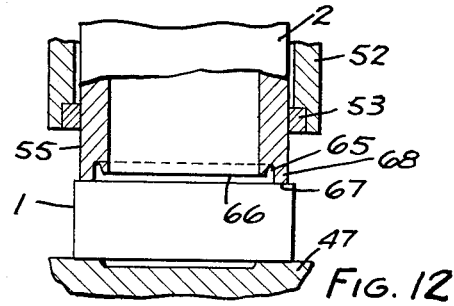
Figure 13:
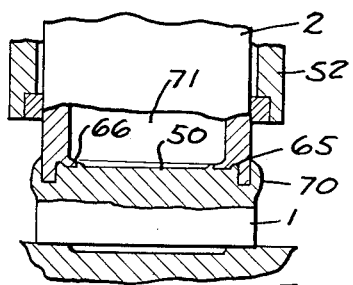
Figure 14:
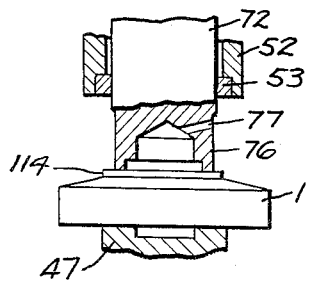
Figure 15:
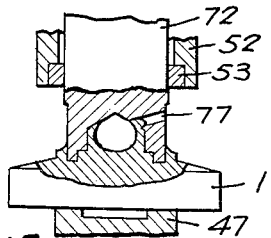

FIGS. 10 and 11; FIGS. 12 and 13; and FIGS. 14 and 15 show modified forms of the method of fusing or welding the base and body of the tappet together.

Figure 16:
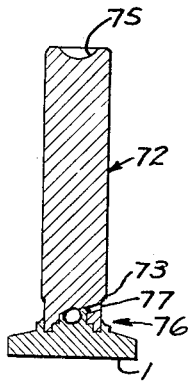

FIG. 16 is a sectional view showing a modified form of tappet which is made by one of the herein described methods.

Figure 17:
Figure 18:
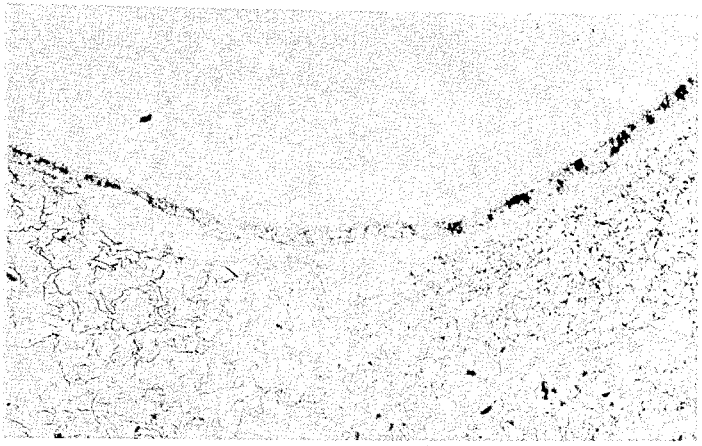
Figure 19:
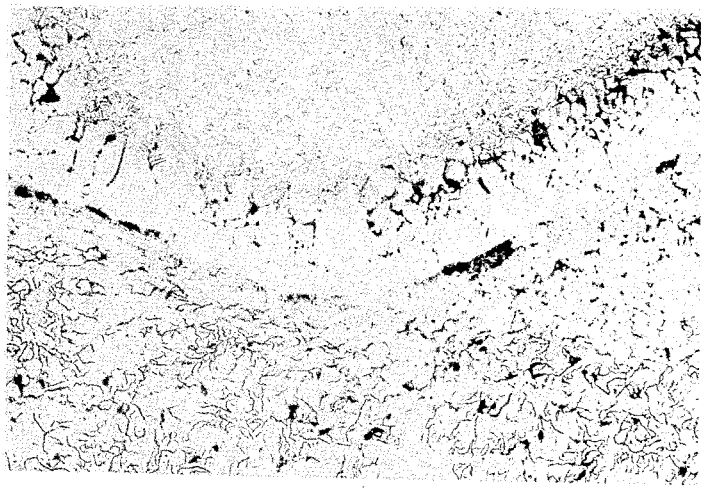

FIGS. 17, 18, and 19 are photomicrographs of the weld area which are described more in detail below.

Referring more particularly to the drawings there is shown in FIG. 9 a tappet comprising a base 1 and a hollow body 2 which has been made according to the method illustrated in FIGS. 1 through 8 of the drawings.

The body 2 of this tappet is formed from a blank 3 preferably of low carbon steel tubing. Blank 3 is preferably welded low carbon steel tubing but, if desired, can be seamless tubing.

Figure 1:
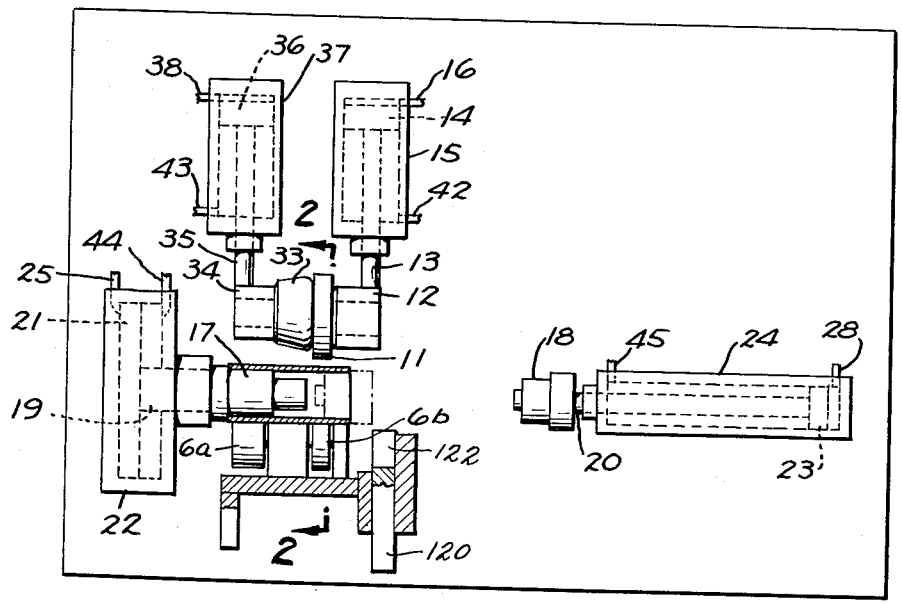
FIG. 1 is a top plan view, partly in section, of an apparatus for making one form of tubular tappet body.
Figure 2:
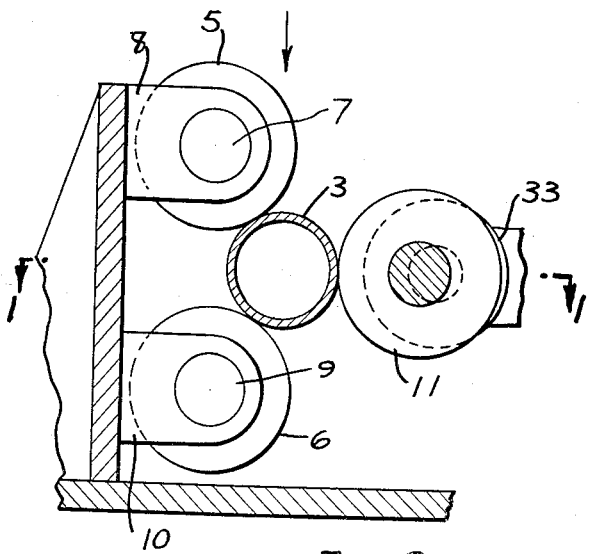
FIG. 2 is a vertical section of the apparatus taken along the line 2—2 of FIG. 1.
Figure 4:
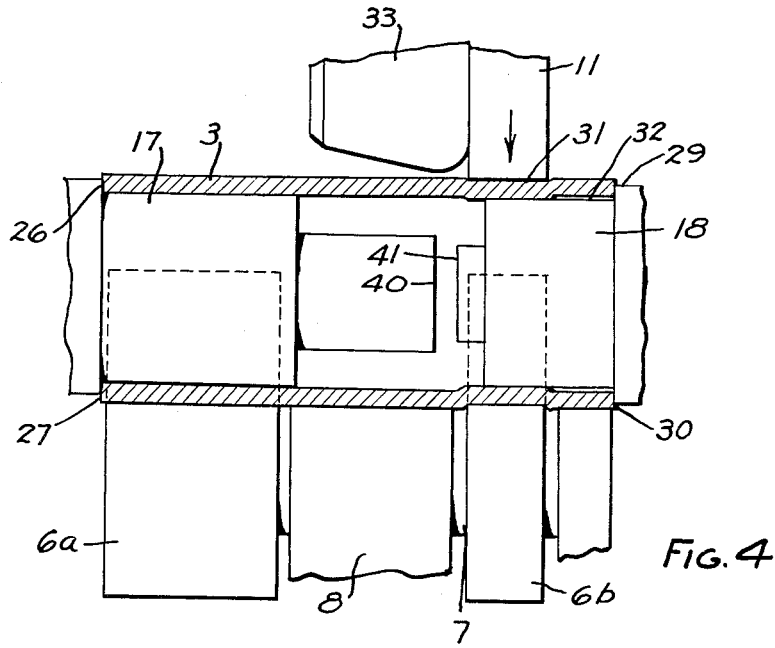
FIG. 4 is a fragmentary plan view of the apparatus showing the first operation of rolling a portion of the tubular blank to reduce its diameter.

Blank 3 is placed upon opposed rollers 5 and 6, FIG. 2. Roller 5 comprises a pair of rollers 5a and 5b which are driven from an auxiliary source of power and are mounted on a common shaft 7 and journalled in the stationary support 8. Roller 6 comprises a pair of rollers 6a and 6b driven by an auxiliary source and mounted on a common shaft 9 and journalled in a stationary support 10. Rollers 5 and 6 are driving rollers and idling roller 11 is journalled upon support 12 carried on piston rod 13, connected to piston 14 within cylinder 15. Arbors 17 and 18 are next moved within blank 3, as shown in FIG. 4. Arbors 17 and 18 are rotatably mounted upon supporting shafts 19 and 20 respectively. Shaft 19 is fixed at its outer end to piston 21 within cylinder 22. Shaft 20 is fixed at its outer end to piston 23 within cylinder 24. Fluid under pressure admitted into cylinder 22 through line 25 moves arbor 17 to the right until shoulder 26 abuts against end 27 of blank 3. Fluid under pressure admitted into cylinder 23 through line 28 moves arbor 18 to the left until its circumferential shoulder 29 abuts against the other end 30 of blank 3. Fluid under pressure is now admitted into cylinder 15 through line 16 which causes idler roller 11 to press against and rotate with tube 3 upon rollers 5 and 6. Thus, roller 11 reduces the diameter of blank 3 throughout the width of roller 11 to form an annular groove 31. It will be noted that arbor 18 has a diameter slightly less than the internal diameter of blank 3 as indicated by the clearance 32. Roller 11 has two functions, first, as described above, it is used to size blank 3. Commercial seamless or welded tubing is graded by the tolerances on the O.D. and I.D. The closer the tolerances are held, the more expensive the tubing, thus by my method, outlined above, I am able to buy the cheaper tubing with wide tolerances and by subjecting it to the above described method produce a part with very close tolerances, thus saving considerable on the cost of the original material. Second, this roller 11 keeps blank 3 from expanding when it is subjected to pressures on each end in the upsetting operation which appears further on in this description. Forming roller 33 is journalled upon support 34 carried at the outer end of rod 35. The inner end of rod 35 is connected to piston 36 within cylinder 37.

While roller 11 is rotated by blank 3 upon rollers 5 and 6, fluid under pressure is admitted into cylinder 37 through inlet 38, thus causing forming roller 33 to move toward blank 3 and rollers 5 and 6 (leftward in FIG. 2), thereby rolling a circumferential groove or cannelure in blank 3. Since blank 3 is confined at its ends by shoulders 26 and 29 of arbors 17 and 18 throughout the rolling operation of rollers 33 and 11 and since this confinement prevents elongation of blank 3, therefore section 101, which is reduced in diameter, is thickened by the rolling operation.

Figure 5:
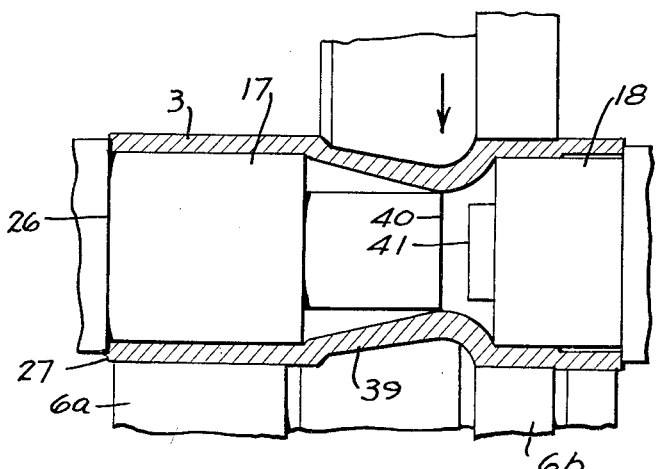
FIG. 5 is a fragmentary view of the apparatus showing the second step of rolling a shoulder in the tubular blank preparatory to the succeeding step of longitudinally upsetting the reduced portion of the tube.
Figure 3:
FIG. 3 is an elevation partly in section of a tubular body blank before rolling.

After the rolling operation illustrated in FIG. 5, roller 33 is retracted by admitting fluid under pressure into cylinder 37 through line 43, line 38 being open to exhaust at this time. While the arbor 18 remains in position in the right hand end of the blank 3, a buck 120 is shifted upwardly in FIG. 1 by manual or other means, not shown. The buck 120 has a bifurcated end 122 which embraces the piston rod 20 to back up the arbor 18 against rightward movement. The parts are shown in this position in FIG. 6. Fluid under higher pressure is next admitted through inlet 25 into cylinder 22 thereby moving arbor 17 inwardly or to the right, FIG. 6, until the end 40 of arbor 17 contacts the end 41 of arbor 18. As arbor 17 moves to the right or axially of tube 3 from the position shown in FIG. 5 to that shown in FIG. 6, shoulder 26 presses against end 27 of blank 3 and this pressure shortens the length of tube 3 and upsets blank 3 to form shoulder 100. Roller 11 is now retracted by admitting fluid under pressure into cylinder 15 through line 42, line 16 being open to exhaust at this time. After rollers 11 and 33 have been withdrawn from the blank to the position shown in FIG. 1, arbors 17 and 18 are next withdrawn by admitting fluid under pressure into their respective cylinders through lines 44 and 45, lines 25 and 28 being open to exhaust at this time. Oil holes 46 are next drilled or punched in blank 3 and blank 3 may then be ground to size in a centerless grinder to thereby complete body 2, FIG. 9. The roller forming method herein described is claimed in my copending application S.N. 695,557, filed November 12, 1957, and a machine for performing such a method is claimed in my copending application S.N. 71,758, filed November 30, 1960.

Body 2 as thus finished is next fused to the base 1. One method of performing the fusing operation is shown in FIGS. 7 and 8. Base 1 with its upper and lower faces 50 and 51 ground to size and parallel is placed upon lower electrode 47. Body 2 is placed within upper electrode 52 and out of contact therewith except for contacting electrode ring 53. Upper electrode 52, 53 and lower electrode 47 are arranged to be connected into an electrical heating and welding circuit which may be of conventional design. With the lower end of body 2 in contact with the upper face 50 of the base 1 and with sufficient pressure to form a good electrical contact without arcing, electrical current is applied and the current flows from upper electrode 52, 53 through the lower end 55 of body 2 through base 1 and into lower electrode 47 to heat these parts.

During this heating step the lower end 55 of the body 2 and the adjacent facial region of the base 1, which is in contact with the tube, are brought to the melting temperature of cast iron, that is, around 2300° F. The lower end of the steel body 2 during the heating step will be brought to approximately the same temperature as the adjacent facial area of cast iron base 1. Since the wall thickness of body 2 is only about 1/16 of an inch, the pressure applied downwardly on body 1 should not be sufficient to materially upset the heated end 55 of the body 2 during heating and while forcing the end of the body into the base. Since the current will take the shortest path between electrodes 53 and 47, therefore only the lower end of the body 2 and the outer circumferential portion of the base 1 will be heated to any substantial amount. Heat is applied for such length of time as is required to effect heating of the work to the requisite fusing temperature and then it is discontinued. This heating to the temperature specified can be accomplished by applying the proper fusing current and pressure for the particular parts being assembled and depending on the cross section of the parts being put together.

As downward pressure is applied to body 2 (the current being on), the adjacent area of base 1 will melt and the lower end 55 of body 2 will displace the molten metal or cast iron as it penetrates into the base 1 as shown. The outer diameter of the base 1 is slightly larger than the outer diameter of body 2 in order to get uniform heating of the surface of base 1 around its circumference. As the heated lower end 55 of the tube 2 penetrates into the locally melted area of the cast iron base, most of the cast iron from the base flows upwardly around the outer diameter of the lower end of the tube 2 as at 60. After the tube penetrates the base to the requisite or desired depth, the current is cut off. The base 1 and body 2, which have now been fused together as above described, are removed from the welding machine. The outside diameter of the tappet assembly is then ground and thereafter carburized, quenched and tempered. After heat treat the base is ground to the proper contour and the O.D. is ground to the correct limits. The piece is washed and a stamping 61 in the form of an inverted cup with dished center 62 which forms a socket for the lower end of push rod 63 is now set into the body 2 with the edge of cup 61 resting upon shoulder 100. The tappet is now complete and ready for use.

In FIGS. 10 and 11 the method is the same as that illustrated in FIGS. 7 and 8, the only difference being that the wall thickness of body 2 is greater than that illustrated in FIG. 7. Instead of 1/16 of an inch, the wall thickness of the base 2 in FIGS. 10 and 11 can, for example, be 1/4 of an inch or greater. The advantage of greater wall thickness is that more rapid resistance heating can be effected and more downward pressure applied upon the body 2 without upsetting the lower end 55. In other words, due to the increased wall thickness shown in FIGS. 10 and 11, greater current can be passed through lower end 55 and the method can be performed with greater rapidity than in case of the body with a thinner wall as in FIG. 7.

In FIGS. 12 and 13 the lower edge of the body 2 is provided with a recess or groove 65 which provides a lip 66. The lip 66 is spaced upwardly from the lower end 67 of body 2. When the welding current is applied to the circuit, the current initially flows through electrode 52, 53, body 2, reduced end section 68, base 1 and lower electrode 47. During the initial or preheating stage, that is, while the lower end 55 of the body 2 and the adjacent facial area of base 1 are brought up to the melting temperature of the cast iron or ferrous base alloy from which base 1 is made, lip 66 heats but very little and only by conduction from the lower end 55 since all of the current passes through the reduced end 68 of body 2. Here again the base 1 has a slightly greater diameter than the outer diameter of body 2. Downward pressure is applied to body 2 and as the lower end 68 and the upper adjacent facial portion of the base 1 reach the melting temperature of cast iron, reduced end 68 penetrates into the locally melted area of the base 1. As soon as lip 66 contacts base 1, current then also flows through lip 66 and causes it to heat up to a forging temperature whereupon the downward pressure exerted upon body 1 causes the lip 66 to deform inwardly as shown in FIG. 13. Lip 66 acts as a dam and prevents the molten cast iron from flowing within the hollow body 2. In this method substantially all of the molten cast iron flows into circumferential groove 65 and outwardly and around the outer diameter as at 70. Since none of the cast iron flows into the chamber 71 formed by the upper face 50 of the base 1 and the hollow body 2, this chamber is adapted and can be used as a hydraulic pressure chamber for a hydraulic tappet or valve lifter structure.

In FIG. 16 there is shown a mushroom tappet which comprises a solid body 72 of bar steel having its lower end counterbored as at 73. While the lower end of the body 72 is being counterbored, the outer diameter of the lower portion can simultaneously be reduced by grinding or machining, say, for example, .010 to .015 of an inch, as at 76. The upper end of the body 72 is provided with a concave seat 75 adapted to receive an end of the valve 5 push rod. The upper face of base 1 is provided with a boss 114 (FIG. 14) which, by way of example, has a height of about 3/64 of an inch and a diameter of about 1/16 of an inch greater than the outer diameter of body 72. This boss is important because it concentrates the heat in the fusion area during the fusion step. Body 72 and cast iron base 1 are placed in electrodes 52, 53 and 47 in the same manner as above described, and downward pressure applied against body 72. It is, of course, understood that body 72 in all of the methods can be held stationary and base 1 forced upwardly or axially toward body 72 or bodies 2 in the other described methods. Fusing current is applied through the electrodes and body 72, reduced end portion 76, base 1 and electrode 47 until the reduced end portion 76 and adjacent areas of the base 1 are brought up to the melting temperature of cast iron. Here again, due to the downward pressure exerted on body 72, reduced end section 76 which is well below the melting point of steel, penetrates into the locally melted area of base 1 and thereby, as in the above described methods, causes the lower end 76 and base 1 to fuse together (FIG. 15). Vent 77 in body 72 permits the escape of air during the welding or fusing operation. The next step in the fabrication of the tappet is to heat treat or carburize and then the base is ground to the proper contour and lastly the O.D. of the body is centerless ground to the finished dimension. The tappet is now ready for use.

The difference in melting points between the steel body and cast iron base is set forth above by way of example. This difference in melting temperatures need only be sufficient so that the end of the steel body which penetrates the locally melted area of the base (which is of cast or sintered iron or ferrous base alloy) will not melt, or in any event will not melt sufficiently in depth and area to lose its penetrating power.

In FIG. 17, there is shown the typical appearance of the weld area in the unetched condition. One can see the cast iron with the graphite flakes, normal structure of this material, as well as the normal appearance of the low carbon steel.

It is important to note that there is not a continuous line of demarcation between the two alloys, but rather a zone in which the graphite flakes are fewer and smaller in appearance. This indicates that some of the original flakes did go into solution and were unable to precipitate out during the cooling process.

FIG. 18 shows the same area as FIG. 17, and shows the appearance of the structure after a relatively light etch in Nital.

The light etching reveals a zone within the steel portion of high carbon content as indicated by the dark band. In this zone even at relatively low magnification one can see the penetration or diffusion of the carbon in a manner similar to the penetration and diffusion produced by a carburizing process.

It is also visible under the microscope that the higher carbon zone of steel merges into the original low carbon steel of the tube. This shows without doubt that carbon passed from the cast iron to the steel during the welding, and because of the rapidity of the cooling, microconstituents of the type usually referred to as "martensite" were formed. These constituents appear as needle-like forms and impart to iron alloys relatively high hardness. As further evidence of the diffusion, one can see massive carbides (white constituents) which contain only combined carbon.

Because of the constituents present at the weld zone, the mechanical properties of the weld, and specifically ductility, are not at an optimum level after the welding operation. It becomes highly desirable, then, to subject the weld to a heat treating process by which the mechanical properties can be further improved. During this heat treating operation the steel portion or body of the tappet is carburized and hardened and the fusion area or joint between the cast iron base and the steel body is refined according to the structure shown in FIG. 19. The carburizing is done by a well known process at a temperature of about 1550° F. for about one hour to one hour and a quarter.

In FIG. 19, there is shown the structure of a weld thus improved by heat treating. The cast iron has hardly been affected while the original narrow band of high carbon has further diffused into the steel giving a more even gradient of carbon concentration from the cast iron, on one side, to the original low carbon steel, on the other.

Of further importance is the fact that, as in the "as weld" sample, the outer zone from which the flakes disappeared is yet free from graphite flakes, the carbon is now in the combined form, and no martensitic needles or massive carbides are present. Thus, by heat treating the sound weld, the general mechanical properties have been improved.

I claim:

1. The method of joining a steel body with a body of a ferrous base alloy having a lower melting point than the steel, comprising placing the two bodies in contact along a flat horizontal area with the steel body above the ferrous base alloy and located a substantial distance inside the periphery of the ferrous base body, passing electric current through the contact area to locally heat the bodies at and adjacent to their area of contact to a temperature at or above the melting point of the ferrous base alloy and below that of the steel, and applying pressure to the said bodies while so heated to thereby cause the steel body in substantially undeformed shape to penetrate into the ferrous base body and displace the molten metal upwardly to form a fillet connecting the two bodies and thereafter cooling the said bodies to obtain a solid fusion joint between the two.

2. The method defined in claim 1 wherein the heating current is applied during the penetration of the steel body into the ferrous base alloy body and the current is shut off as soon as the steel body has penetrated the required depth into the ferrous base alloy body.

3. The method of making a valve tappet body comprising a cup having a shouldered cylindrical interior and a wear resistant end surface which comprises the steps of deforming radially inwardly the wall of a tubular body intermediate its ends while preventing elongation of the body to produce a cannelure the wall of which is slightly thicker than the original wall of the tube and joining a body of metal to one end of the tubular body by a fused metal joint to form a combined closure and cam-contacting base for the tappet body.

4. The method of making a valve tappet body comprising a cup having a shouldered cylindrical interior and a wear resistant end surface which comprises the steps of deforming radially inwardly the wall of a tubular body of low carbon steel intermediate its ends while preventing elongation of the body to produce a cannelure the wall of which is slightly thicker than the original wall of the tube and joining a body of cast iron directly to one end of the tubular body by a fused joint to close the end of the tube and to provide a wear-resisting end surface for the tappet body.

5. The method of making a valve tappet which comprises the steps of deforming inwardly the wall of a piece of steel tubing by rolling the outer surface under radial pressure to bring the inner surface into contact with a cylindrical support, joining a body of cast iron to one end of the tube by direct fusion of the end face of the cast iron body and positioning a third member having a cylindrical outer surface in telescoping relation to said deformed inner surface.

6. The method of making a valve tappet which comprises the steps of deforming radially inwardly the wall of a tubular body intermediate its end while preventing elongation of the body to produce a cannelure the wall of which is slightly thicker than the original wall of the tube, applying axial pressure to the end of the tube to thereby upset the cannelure axially to form an internal shoulder and then weld uniting one end of the tube with a metal end piece.

References Cited in the file of this patent

UNITED STATES PATENTS

| | | |
|---|---|---|
| 529,597 | Cayley et al. | Nov. 20, 1894 |
| 743,193 | Rainforth | Nov. 3, 1903 |
| 1,121,619 | Ellery | Dec. 22, 1914 |
| 1,366,788 | Grable | Jan. 25, 1921 |
| 1,448,862 | Phelps | Mar. 20, 1923 |
| 1,686,562 | Jackson | Oct. 9, 1928 |
| 1,691,778 | McDonald | Nov. 13, 1928 |
| 1,691,779 | McDonald | Nov. 13, 1928 |
| 1,805,255 | Osterholm | May 12, 1931 |
| 1,848,083 | Wetherald | Mar. 1, 1932 |
| 2,030,166 | Huck | Feb. 11, 1936 |
| 2,032,906 | Biewend et al. | Mar. 3, 1936 |
| 2,055,342 | Schneider | Sept. 22, 1936 |
| 2,101,917 | Plater | Dec. 14, 1937 |
| 2,178,724 | Hoern | Nov. 7, 1939 |
| 2,203,868 | Gray et al. | June 11, 1940 |
| 2,265,561 | Hoern | Dec. 9, 1941 |
| 2,328,512 | Thoren et al. | Aug. 31, 1943 |
| 2,352,754 | Anderson | July 4, 1944 |
| 2,388,249 | Buckwalter et al. | Nov. 6, 1945 |
| 2,741,024 | Breuer | Apr. 10, 1956 |

OTHER REFERENCES

Welding Handbook (3rd ed.), p. 1557, published by American Welding Society, New York, N.Y.